United States Patent [19]

Usick

[11] Patent Number: 5,021,029
[45] Date of Patent: Jun. 4, 1991

[54] GRAIN SAVER ATTACHMENT FOR THE STRAW WALKER OF A COMBINE

[76] Inventor: Cliff Usick, Box 25, Newdale, Manitoba, Canada, R0J 1J0

[21] Appl. No.: 429,996

[22] Filed: Nov. 1, 1989

[51] Int. Cl.⁵ .................... A01D 41/02; A01F 12/30
[52] U.S. Cl. ............................ 460/85; 56/14.6
[58] Field of Search ............... 460/85, 59, 79; 56/14.6

[56] References Cited

U.S. PATENT DOCUMENTS

| | | | |
|---|---|---|---|
| 1,864,005 | 6/1932 | Taylor | 460/85 |
| 3,599,644 | 8/1971 | Bichel | 460/85 |
| 3,603,063 | 9/1971 | Stroburg | 460/85 X |
| 3,734,102 | 5/1973 | Pool | 460/85 |
| 4,150,525 | 4/1979 | DeBusscher et al. | 460/85 X |
| 4,392,500 | 7/1983 | Houle | 460/85 |
| 4,606,356 | 8/1986 | Odahara | 460/85 X |

Primary Examiner—Thuy M. Bui

Attorney, Agent, or Firm—Adrian D. Battison; Stanley G. Ade; Murray E. Thrift

[57] ABSTRACT

In a conventional combine harvester which includes straw walkers which move in an orbital path so as to lift and move straw rearwardly along the straw walkers there is provided an improved attachment device including a surface which is inclined from a front edge upwardly and rearwardly to a rear edge at a position elevated above the saw-toothed side edge of the straw walker and at least one supplementary saw-toothed element positioned at the surface and having a saw-toothed upper edge for lifting straw over the surface and along the remainder of the straw walker. The attachment improves the separation action of the straw walkers and causes more grain to escape from the straw at the attachment with the grain then sliding downwardly and forwardly from the surface through perforations in the straw walker for collection on the conventional shoe.

8 Claims, 2 Drawing Sheets

GRAIN SAVER ATTACHMENT FOR THE STRAW WALKER OF A COMBINE

BACKGROUND OF THE INVENTION

This invention relates to an attachment device for the straw walkers of a combine harvester.

Combine harvesters of the conventional type include a cylinder which receives the harvested crop and acts initially to cut the straw of the crop and to separate the seed materials and chaff from the straw. The cylinder does not complete the separation process and accordingly the straw is dumped upon a set of straw walkers which move the chopped straw rearwardly from the feed end of the straw walkers toward a rear discharge end with the straw being agitated to cause the seed material to drop from the straw for collection and separation in a further part of the combine.

Conventionally each of the straw walkers comprises a pair of separate vertical plates with a transverse web between the plates. The upper edge of each of the plates is cut into a sawtooth configuration. The web is perforated. The whole straw walker is mounted upon a pair of crank elements which move the straw walker in an orbital motion so that it moves upwardly, rearwardly, downwardly, and forwardly. Adjacent straw walkers are arranged to be substantially in opposite phase so that as one moves forwardly the other is moving rearwardly. In this way, the straw is lifted and then moved rearwardly by its engagement with the sawtooth edges. This agitation also causes the seed material to drop out of the straw and fall onto the webs and then through the perforations for collection and further separation in a different part of the combine.

Careful study of conventional combines will however show that straw walkers are somewhat inefficient so that much of the seed material remains in the straw as it is discharged from the rear end and is thus lost causing significant reduction in yields.

SUMMARY OF THE INVENTION

It is one object of the present invention therefore to provide an attachment device for mounting on upon a conventional straw walker which enables more of the seed material to be recovered.

According to the first aspect of the invention, therefore, there is provided a combine harvesting machine comprising a plurality of straw walkers for separating straw from seed material, the straw walkers being arranged in side by side relationship and extending from a front feed end to a rear discharge end, means for driving the straw walkers such that each moves in an orbital path to cause lifting and rearward movement of the straw resting on top of the straw walker with the phase of each straw walker being angularly offset from that of adjacent straw walkers, each straw walker comprising an elongate body having at least one upstanding sawtooth element extending along the length of the elongate body for lifting and moving the straw in a rearward direction and a perforated transverse web for allowing the seed materials to fall through the web for collection as they separate from the straw as it is moved rearwardly by the straw walkers, at least one of the straw walkers having mounted thereon an attachment device at a position part way along the straw walker and extending over only a short length thereof, said attachment device defining a surface which is inclined from a front edge thereof upwardly and rearwardly to a rear edge at a position elevated above the sawtooth edge of the sawtooth element and said attachment device including at least one supplementary sawtooth element positioned at the surface and having a sawtooth edge above the surface for lifting straw over the surface.

According to a second aspect of the invention there is provide an attachment device for mounting on a straw walker of a combine harvester comprising a pair of plates each including means for connection to a sawtooth element of the straw walker so as to extend upwardly therefrom and each having an inclined upper edge thereof which has a sawtooth configuration and a plate member for extending across the straw walker between the plates and having an upper surface which inclines upwardly and rearwardly from the straw walker.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

Figure 1:
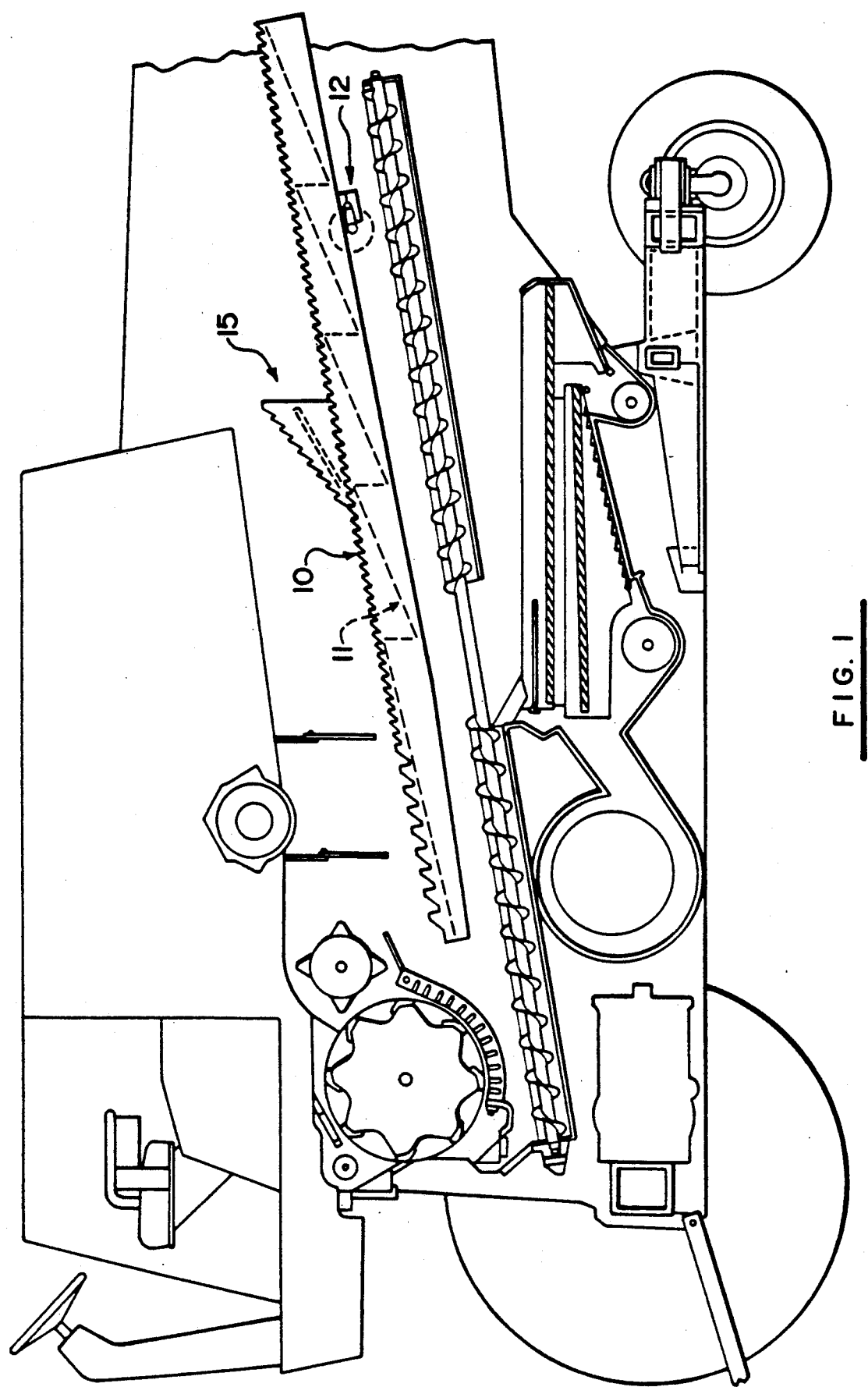
FIG. 1 is a side elevational view showing schematically the parts of a conventional combine with the attachment device of the present invention mounted on one of the straw walkers.

A substantially conventional combine harvester is shown in FIG. 1 in which the header and feeder housing are omitted. Conventionally the crop is fed through the feeder housing via the stone traps to the cylinder and concave where an initial separation action takes place for separating the straw from the seed materials. The seed materials then are delivered to the shoe which acts to separate grain from chaff. Augers are providing for transporting grain from its point of separation from the straw to the shoe.

From the cylinder the straw is discharged by the rotary deflector via the curtains onto the straw walkers.

The straw walkers comprise a plurality of elongate members. Each member comprises a pair of side plates 10 and a transverse web arrangement 11 which spans the space between the side plates. The upper edge of each of the side plates is formed into a sawtooth configuration. As shown in FIG. 1 the web 11 is formed into a plurality of inclined steps which extend from a position adjacent the bottom edge of the side plate 10 to a position adjacent the top of the side plate 10. The web 11 is perforated with a series of holes or slots which allow the grain or the seed material to fall through for collection directly on the shoe or by the supply augers.

The whole of each straw walker is driven in an orbital movement by a pair of crank arrangements one of which is indicated at 12. The crank arrangements thus drive each straw walker so that it moves upwardly, forwardly and then downwardly and rearwardly in a cycling action. Straw walkers are arranged so that their phase is offset so that as one straw walker moves forwardly, the next adjacent straw walkers are moving rearwardly. They are arranged to move rearwardly as they are raised so that the straw entering the front of the straw walker assembly is lifted and moved rearwardly by the straw walkers until it is discharged from the rear end. While this movement is taking place, the straw is agitated by the upward and downward movement of the straw walkers thus theoretically causing the grain or seed material to fall from the straw and to pass through the perforations of the web for collection.

Figure 2:
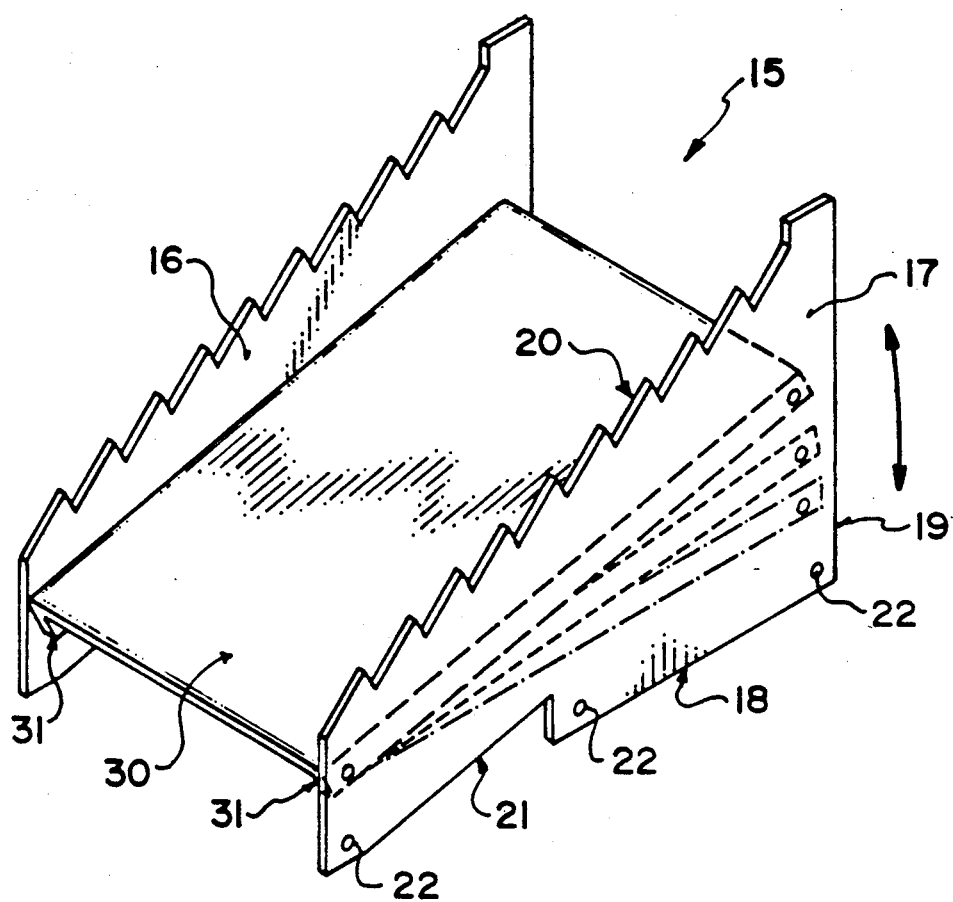
FIG. 2 is an isometric view of one of the attachment devices the present invention.
Figure 3:
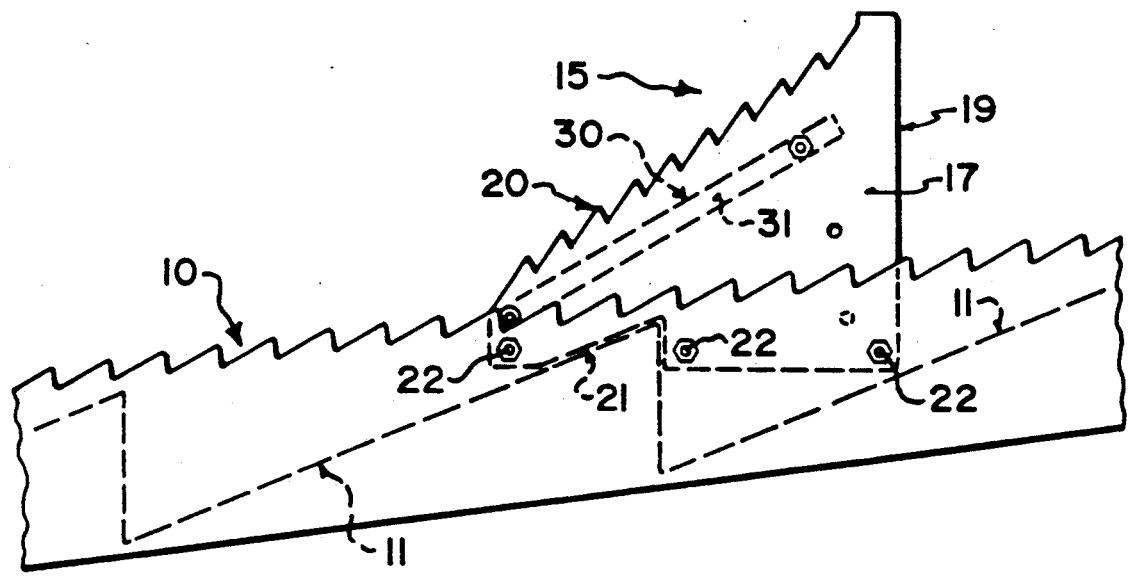
FIG. 3 is a side elevational view on an enlarged scale of one of the attachment devices mounted on one of the straw walkers.

The above straw walkers are entirely conventional and the present invention relates to an attachment device shown in FIG. 2 and generally indicated at 15. The attachment device comprises a pair of side plates 16 and 17 which are substantially triangular in shape. The plates have a bottom edge 18 and a rear vertical edge 19. An inclined top edge 20 extends from a position adjacent the top of the conventional straw walker upwardly and rearwardly therefrom. The top edge 20 has a similar sawtooth configuration to that of the side plate of the straw walker. The bottom edge 18 has a recess 21 which sits over the uppermost apex of the web 11 as best shown in FIG. 3. The plate has three holes 22 spaced apart along the bottom edge so that the plate can sit inside the plate of the straw walker and be bolted thereto by a simple bolt passed through the side plate of the straw walker and the side plate of attachment.

The attachment further includes an inclined plate member 30 which is channel shaped defining shallow sides 31 which are bolted to the side plates 16 and 17.

The front edge of the plate 30 is arranged at the front edge of the side plates and hence commences at a position just about at the top of the conventional straw walker. From that position the plate is incline upwardly and rearwardly. An inclination of the plate can be adjusted by selecting one of a plurality of holes in the side plate by which the plate member can be clamped at the required inclination.

The attachment extends only over a short length of the straw walker and is generally positioned approximately half way along the straw walker at a position adjacent the location where the main action of the straw walker is deposited directly onto the shoe.

Each of the straw walkers includes an attachment device as shown and attachment devices are generally aligned across the width of the machine but of course in operation the attachment device is moved in a cyclical action with the straw walker and hence they move out of the directly aligned position.

In operation the inclined upper surface of the plate member 30 acts to hold back the grain and chaff and to some extent interferes with the forward movement of the straw. This causes an increased separating action at the position of the attachment and causes more grain to escape from the straw at that position with the grain falling onto the plate and then sliding downwardly and forwardly and through the perforations for collection on the shoe. The sawtooth side plates of the attachment act to continue the movement of the straw by walking straw rearwardly over the attachment and back onto the convention straw walkers behind the attachment. Variable inclination is necessary for different types of seed material and this adjustment can be made after suitable experimentation. The height of the attachment from the upper edge of the conventional straw walker to the top edge of the attachment is greater than the amount of vertical movement of the straw walker but is kept sufficiently low so that the straw can pass over the attachment without interfering with the top cover plate.

The attachment can be mounted in place and removed very easily and significantly improves the seed separation providing a significant reduction in seed loss.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combine harvesting machine comprising a plurality of straw walkers for separating straw from seed material, the straw walkers being arranged in side by side relationship and extending from a front feed end to a rear discharge end, means for driving the straw walkers such that each moves in an orbital path to cause lifting and rearward movement of the straw resting on top of the straw walker with the phase of each straw walker being angularly offset from that of adjacent straw walkers, each straw walker comprising an elongate body having at least one upstanding sawtooth element extending along the length of the elongate body for lifting and moving the straw in a rearward direction and a perforated transverse web for allowing the seed materials to fall through the web for collection as they separate from the straw as it is moved rearwardly by the straw walkers, at least one of the straw walkers having mounted thereon an attachment device at a position part way along the straw walker and extending over only a short length thereof, said attachment device defining a surface which is inclined from a front edge thereof upwardly and rearwardly to a rear edge at a position elevated above the sawtooth edge of the sawtooth element and said attachment device including at least one supplementary sawtooth element positioned at the surface and having a sawtooth edge above the surface for lifting straw over the surface.

2. The invention according to claim 1 wherein each of the straw walkers includes two sawtooth elements each comprising substantially a flat plate arranged in parallel vertical planes longitudinally of the straw walker with an upper edge of each of the elements having a sawtooth configuration, the web being positioned between the elements and wherein the surface of the attachment device extends from a position between the elements upwardly and rearwardly therefrom and wherein the attachment device includes two supplementary sawtooth elements each arranged on a respective side of the surface.

3. The invention according to claim 1 wherein the angle of inclination of the surface is adjustable.

4. The invention according to claim 1 wherein the surface is substantially planar and imperforate.

5. The invention according to claim 1 wherein each of the straw walkers includes a separate attachment device with the attachment devices of the straw walkers being substantially aligned across the combine.

6. The invention according to claim 1 wherein the angle of inclination of the surface is adjustable.

7. The invention according to claim 1 wherein the surface is substantially planar and imperforate.

8. An attachment device for mounting on a straw walker of a combine harvester comprising a pair of plates each including means for connection to a sawtooth element of the straw walker so as to extend upwardly therefrom and each having an inclined upper edge thereof which has a sawtooth configuration and a plate member for extending across the straw walker between the plates and having an upper surface which inclines upwardly and rearwardly from the straw walker.

* * * * *